UNITED STATES PATENT OFFICE.

ALBRECHT SCHMIDT, HEINRICH RÖSSNER, AND HANS BALHORN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MANUFACTURE OF BROMINATED BLUE INDIGO DYESTUFFS.

1,043,468.      Specification of Letters Patent.      Patented Nov. 5, 1912.

No Drawing. Original application filed December 17, 1907, Serial No. 406,946. Divided and this application filed January 29, 1909, Serial No. 475,073. Renewed July 26, 1912. Serial No. 711,729.

*To all whom it may concern:*

Be it known that we, ALBRECHT SCHMIDT, Ph. D., HEINRICH RÖSSNER, Ph. D., and HANS BALHORN, Ph. D., citizens of the Empire of Germany, residing at Höchst-on-the-Main, Germany, have invented certain new and useful Improvements in the Manufacture of Brominated Blue Indigo Dyestuffs, of which the following is a specification.

This application is a division of application Ser. No. 406,946, filed Dec. 17, 1907.

We have found that when the greenish-black products (perbromids) manufactured at raised temperature in concentrated sulfuric acid or monohydrate according to Examples II and III of the U. S. Patent 918,920, application Ser. No. 406,946, are treated with a bisulfite solution or other agents, capable of eliminating bromin, blue brominated indigo dyestuffs are obtained which contain a percentage of halogen corresponding to at least 4 atoms of halogen. The dyeings produced by means of these dyestuffs on cotton in the hydrosulfite vat are characterized by their shades having a remarkable green hue, which are specially apparent when seen in artificial light.

Example I: Dibromindigo—obtained for instance by bromination of indigo—is converted, according to the process described in the U. S. Patent 918,920, into the greenish-black perbromid in the following manner: 1 part of dibromindigo is introduced into 4–10 parts of monohydrate or concentrated sulfuric acid while stirring and well cooling, during which operation it is advantageous for the better distribution i. e. conversion of the indigo to grind the mass for some time in the ball-mill; then 1.5 parts of bromin are run in while cooling and stirring and the temperature raised up to about 45° while well stirring or grinding, which temperature is maintained for some hours. Thereupon the stirring of the mass is continued for several hours at ordinary temperature. The product of the process described in the U. S. Patent 918,920 separates as a greenish-black mass (perbromid). For isolating this mass it can be filtered from the sulfuric acid and finally pressed out between clay and asbestos. Now, 10 parts of this product or the reaction mass itself are poured into 40 parts of a concentrated bisulfite solution which has been diluted with ice, whereupon the blue dyestuff separates in the form of blue flakes and is then isolated by filtration. This dyestuff after being dried turns into a violet-blue powder which is soluble in concentrated sulfuric acid with a blue color. This product contains about 55 to 58% of bromin and dyes in the hydrosulfite vat cotton a considerably greener blue tint than the tetrabromindigo claimed in U. S. Patent No. 856,776, a fact which is especially apparent in artificial light.

If instead of the dibromindigo, the dichlorindigo claimed in U. S. Patent No. 812,598 be used, which latter may be prepared for instance by chlorinating indigo,— a dyestuff is obtained which dyes quite similar tints and which besides chlorin also contains bromin. In the place of the bisulfite also other agents capable of eliminating bromin may be employed; for instance the greenish-black products may be heated while passing air through the mass, whereby the perbromid gets split and the free bromin volatilizes.

Example II: 10 parts of the greenish-black reaction product which is obtained according to Example I from dibromindigo (or dichlorindigo) by means of monohydrate or concentrated sulfuric acid, and which is used either directly as such or preferably after being filtered from the excess of sulfuric acid,—are poured into a solution, previously prepared with ice, of 15 parts of sodium hydrosulfite and 20 parts of concentrated bisulfite solution while stirring. After the formation of sulfuric acid has ceased the grayish-green product thereby obtained is filtered off. It shows the following properties: It dissolves in concentrated sulfuric acid with a dirty olive-green color, in alkali hydrate with a yellowish-brown color; it dyes cotton in alkaline solution clear blue tints, which especially when seen in artificial light show a green hue.

Having now particularly described our invention what we claim is:

1. The herein described process of making blue brominated indigo dyestuffs, containing at least four atoms of halogen, which consists in treating with agents, capable of eliminating bromin, the greenish-black brominated products from dihalogen indigos containing at least five atoms of halogen, being soluble in highly concentrated sulfuric acid, and turning blue when mixed with water and bisulfite.

2. As new products, the blue brominated indigo dyestuffs containing more halogen than a tetrahalogen indigo, said dyestuffs being soluble in concentrated sulfuric acid with a greenish-blue color, yielding by treatment with nitric acid in glacial acetic acid a product from which 5-7 dibromisatin melting at 249-250° C. may be isolated, and dyeing in the hydrosulfite vat cotton clear blue tints which, especially when seen in artificial light, show a green hue.

3. As new products, the grayish-green leuco compounds from the blue brominated indigo-dyestuffs containing more halogen than a tetrahalogen indigo; said leuco compounds being insoluble in water, soluble in alkali-hydrate solution with a yellowish-brown color, yielding by treatment with nitric acid in glacial acetic acid a product from which 5-7 dibromisatin melting at 249-250° C. may be isolated, and dyeing in an alkaline hydrate solution cotton and wool blue tints.

In testimony, that we claim the foregoing as our invention, we have signed our names in presence of two subscribing witnesses.

ALBRECHT SCHMIDT.
HEINRICH RÖSSNER.
HANS BALHORN.

Witnesses:
JEAN GRUND,
CARL GRUND.